United States Patent [19]

Hale

[11] 4,420,052

[45] Dec. 13, 1983

[54] PATIENT WEIGHING SCALE

[75] Inventor: David C. Hale, Wheaton, Ill.

[73] Assignee: Scale-Tronix, Inc., Wheaton, Ill.

[21] Appl. No.: 181,836

[22] Filed: Aug. 27, 1980

[51] Int. Cl.³ .................. G01G 19/52; G01G 19/14; G01G 21/22

[52] U.S. Cl. .................. 177/132; 177/147; 177/263

[58] Field of Search .............. 177/132, 229, 144, 147, 177/263

[56] References Cited

U.S. PATENT DOCUMENTS 3,797,593  3/1974  Conley ........................ 177/132 X
4,143,727  3/1979  Jacobson ..................... 177/229 X Primary Examiner—George H. Miller, Jr.
Attorney, Agent, or Firm—Cushman, Darby & Cushman

[57] ABSTRACT

A patient weighing apparatus including support elements having two pivotal axes coupling a weight measuring transducer to a cantilever boom and a patient stretcher, thereby assuring that the weight measuring transducer, the points of connection to the boom and the center of gravity of the patient are in a single vertical plane so that off center loading errors are avoided. The support elements include an elongated bending moment type load cell, a swivel bar beneath supporting the stretcher and other pivot structure above, coupling the load cell to the cantilever boom.

11 Claims, 3 Drawing Figures

U.S. Patent     Dec. 13, 1983     4,420,052
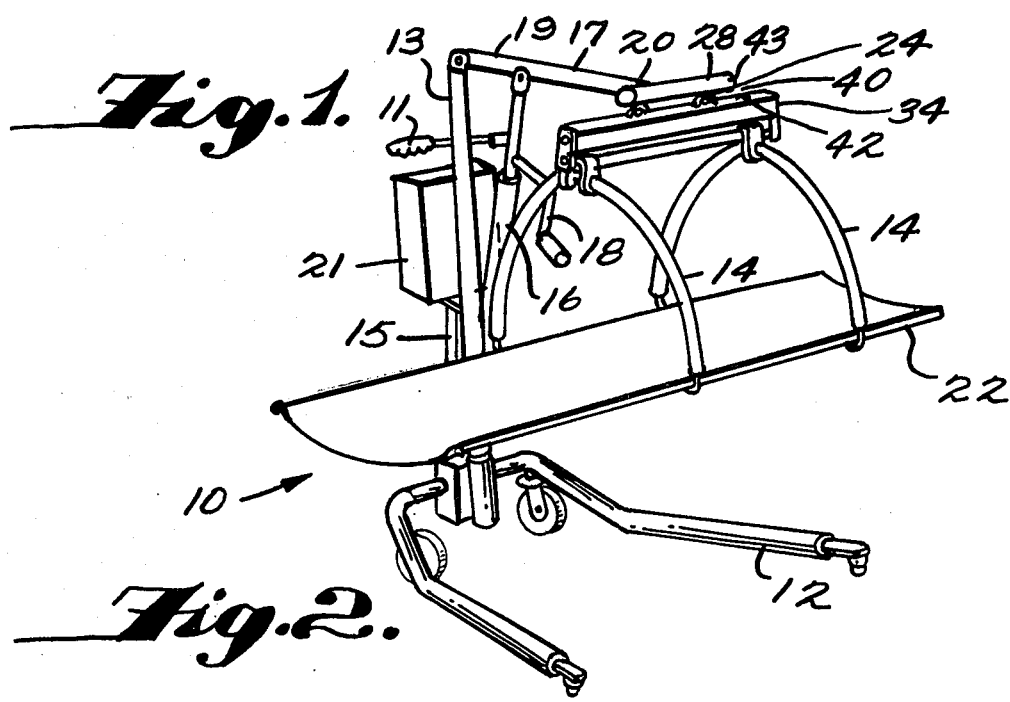
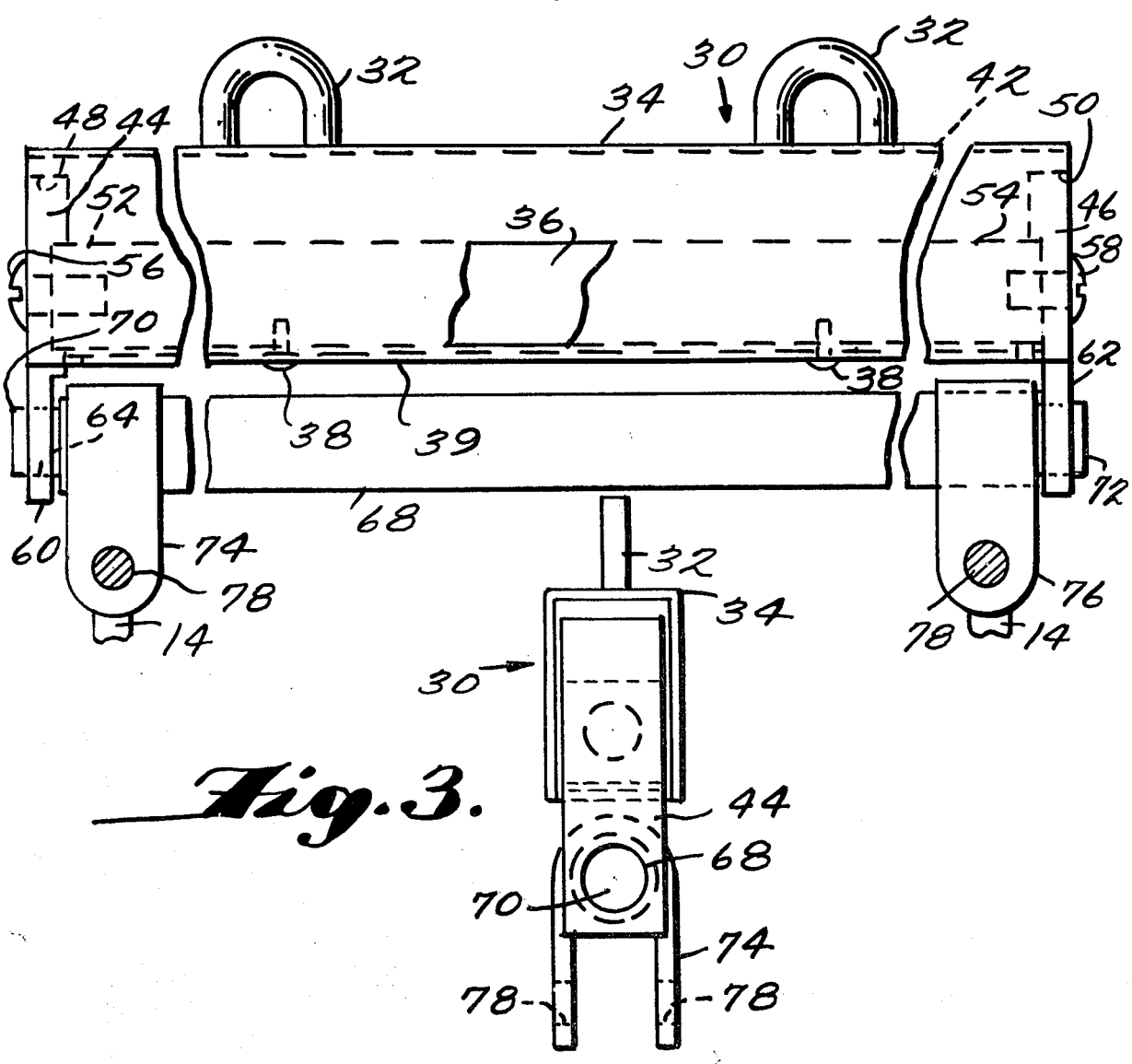

PATIENT WEIGHING SCALE

FIELD OF THE INVENTION

The present invention relates to a patient weighing scale and more specifically to such a scale which provides the patient's exact weight irrespective of the patient's sideways position in the associated patient stretcher.

BACKGROUND AND SUMMARY OF THE INVENTION

A patient weighing scale of the general type as the present invention is disclosed in the copending application, Ser. No. 664,709, filed Mar. 8, 1976. The scale disclosed in the copending application comprises a conventional frame structure with a cantilever boom having a free end as well as a secured end pivoted to the frame structure. A stretcher arrangement is removably and pivotally connected to the boom by a support which includes two bending moment measuring transducers responsive to the weight on the stretcher. The outer ends of the transducers are fixed to hoops which are in turn secured to the stretcher proper. The stretcher proper is thus fixed relative to the transducers. As a result, if the patient's weight is not perfectly aligned along a center line extending longitudinally down the middle of the stretcher, the overall stretcher as well as the transducers will rotate somewhat away from a vertical plane until the patient's center of gravity is directly beneath the free end of the boom. Transducers of this type measure bending moments in only a single plane which in this case would extend through the center line of the stretcher. Accordingly, when the stretcher and transducers are rotated away from the vertical, they will respond to only a fraction of the patient's weight, thereby providing an erroneous reading.

Patient weight scales are often used to measure the weight of very ill and often highly dehydrated and underweight persons such as burn patients. It is very important in monitoring such patients' progress to measure very small increases and decreases in weight with great accuracy a number of times in a single day. Consequently, very small errors in weight change measurement can be very significant. It is therefore desirable to improve the accuracy of patient weighing scales to the maximum extent possible.

The present invention can significantly improve the reliability of patient weight measurements. The invention consists of an improved design of the transducer means and the support element connecting the stretcher to the cantilever boom of the frame structure in a patient weighing arrangement such as is disclosed in the copending application, Ser. No. 664,709, the components of which are summarized above.

In the preferred embodiment, a conventional elongated transducer means which measures bending moments at both of its ends is mounted in an open ended tube housing. The housing is removably and pivotally mounted at its top surface to the free end of the cantilever boom. The outer ends of the transducer means are fixed to end plates which in turn pivotally support therebelow a longitudinally extending support bar. The support bar supports the stretcher beneath. This structure operates to permit the transducer means to remain in the vertical plane regardless of the location of the center of gravity of the patient relative to the stretcher on which he lies prone, thereby insuring the accuracy of the weight measurement.

The arrangement has two pivotal axes, one above the load cell at the boom, another between the side plates beneath the load cell. In accordance with another feature of the invention, these two pivotal axes are equidistant from the load cell's center axis, which provides fast acting self-righting moment forces which keeps the load cell vertical regardless of the elevation of the boom or the location of the center of gravity of the patient.

In accordance with another aspect to the invention, the transducer means may comprise a single elongated double ended load cell, rather than two separate load cells as used in prior patient scales. Each end of the load cell can be provided with either a full bridge or half bridge circuit arrangement of strain gauges. The two ends may be matched by mechanical fine tuning instead of electrical matching as is required with two separate load cells.

Two pivot points, both beneath the weight measuring transducers, have been used in a traveling block weighing device disclosed in U.S. Pat. No. 3,095,057 issued to Kraeling. However, Kraeling's device is designed for protection against dangerous side loads on its two vertical tension type load cells, produces much reduced self-righting forces and would not be useful in a patient weighing scale designed for enhanced accuracy and reliability.

BRIEF SUMMARY OF THE DRAWINGS

The invention may be more fully understood from the following detailed description of the preferred embodiment with reference to the accompanying drawings in which:

FIG. 1 is a perspective view of the overall patient weighing apparatus of the present invention;

FIG. 2 is an enlarged front elevation of the stretcher supporting elements of the present invention with a portion broken away for clarity; and FIG. 3 is an enlarged side elevation of the stretcher supporting elements of the present invention.

DETAILED DESCRIPTION OF THE PREFERRED EMBODIMENT

FIG. 1 illustrates a patient weighing scale arrangement according to the invention, including a frame structure 10 having a caster supporting base 12 and an upright post 13. A handle 11 extends through post 13. A shifting handle 15 of conventional design permits the adjustment of the base 12. A hydraulic of pneumatic jack 16 or the like is operatively interposed between the post 13 and the cantilever boom 17. By operation of the pump handle 18, it is possible to raise and lower the boom 17, since its secured end 19 is pivoted to the post 13.

A read-out console 21 is secured to the post 13 and electrically connected to an elongated load cell to be described in more detail below. The stretcher 22 is removably secured to hoops or bails 14. The hoops 14 are secured to the free end 20 of cantilever boom 17 which includes a horizontal tube member 28 to which in turn are fixed downwardly extending hook members 24, by the support means of the present invention which are most clearly shown in FIGS. 2 and 3.

Referring to FIGS. 2 and 3, support means 30 includes a pair of "eye" handles 32 welded to housing 34 for removably and pivotally mounting the housing 34 onto hooks 24. Frame 34 is suitably a rigid rectangular chrome plated steel tube. A conventional elongated load cell 36, responsive at opposite ends to downward bending moment forces, is fixed within the tube 34 by centrally located upwardly extending bolts 38, and shim or spacer 3d, with its longitudinal axis parallel to and in substantially the same vertical plane as the longitudinal axis defined by hooks 24. The height of shim 39 provides for a positive overload stop, whereby at a load of approximately 150% of the rated scale capacity, the ends of the loadcell 36 will make contact with the bottom of tube 34, thereby providing for loading on loadcell 36. Adjustable screw 41 may optionally be provided to opposite ends of tube 34 extending vertically upwards from the bottom thereof to provide an adjustable overload stop. Electrical connecting cable 40, shown in FIG. 1, extend through opening 42 in housing 34 from one end of the load cell 36 to the display console 21 through the inside of boom 17 and post 13. For this purpose, there is preferably provided an electrical plug-in connection 43 at one end of the tubular member 28. Vertical end plates 44 and 46 respectively close off the end openings 48 and 50 of tube housing 34 and are fixed to opposite ends 52 and 54 of load cell 36 by horizontally extending bolts 56 and 58. End plates 44 and 46 respectively have lower portions 60 and 62 extending beneath housing 34. Lower portions 60 and 62 have opposing horizontally extending holes 64 and 66. A rotatably support bar 68 extends horizontally with its axis parallel to those of load cell 36 and hooks 24, pivotally held in the vertical plane of load cell 36 and hooks 24 by hardened dowl pins or shoulder bolts 70 and 72 which are fixed to opposite ends of bar 68 and extend through holes 64 and 66. Holes 64 and 68 are vertically placed such that the openings in handles 32, which define the location of a pivotal axis between the boom 17 and support means 30, and the axis of bar 68 are equidistant from the axis of load cell 36. Stretcher hoops 14 are fastened to support bar 68 by downwardly facing U-shaped brackets 74 and 76, each of which have a pair of confronting holes 78 through which the upper end of hoops 14 may pass.

In accordance with this construction, the support means of the invention can pivot on hooks 24 and the stretcher 22 can pivot with support bar 68 into a single vertical plane irrespective of the height of boom 17 and the weight distribution of the patient and stretcher 22, and the measurements made by load cell 36 will be a true reflection of the patient's weight.

It will be appreciated by those of ordinary skill in the art to which the invention pertains that although only a single exemplary embodiment of the invention has been hereinabove described, there are many modifications which may be made fully within the scope of the invention, limited only by the appended claims. For example, it is to be appreciated that alternate means of pivotally coupling the load cell to the stretcher arrangement and to the boom may be utilized.

What is claimed is:

1. A scale for weighing a patient in a longitudinally extending stretcher while mounted to a cantilever boom comprising:
   (1) a housing longitudinally extending in the horizontal plane;
   (2) means, mounted to said housing, for mounting said housing to said boom so as to be pivotable about a first longitudinal axis;
   (3) transducer means for measuring bending moments about a transverse horizontal axis, mounted in said housing, said transducer means having a second longitudinal axis and extending longitudinally in the horizontal plane;
   (4) means, pivotally mounted to opposite ends of said load cell, for mounting said stretcher to said load cell so as to be pivotable about a third longitudinal axis parallel to said first horizontal axis thereby assuring that the full weight of the patient is directed vertically downward without effecting the orientation of said transducer means.

2. A scale as in claim 1 wherein said stretcher mounting means comprises a pair of end plates fixed to opposite ends of said transducer means and, an elongated member pivotally mounted to said end plates beneath said transducer means, said elongated member comprising means for mounting said stretcher thereto.

3. A scale as in claim 2 wherein said boom mounting means is disposed vertically above said transducer means, said first and third longitudinal axes being equidistant from said second longitudinal axis.

4. A scale as in claim 2 or claim 3 wherein said elongated member comprises an elongated bar rotatably mounted to said two end plates, and downward extending brackets fixed at opposite ends of said bar having holes therein adapted for receiving patient stretcher hoops.

5. A scale as in claim 4 wherein said boom mounting means comprise a pair of eye hooks fixed at opposite ends of said housing.

6. A scale as in claim 5 wherein said housing comprises a chrome plated rectangular steel tube which surrounds said transducer means.

7. A scale as in claim 1 wherein said transducer means comprises a double ended load cell, each end adapted for attachment of a bridge circuit arrangement of strain gauges.

8. A scale as in claim 1 wherein said transducer means comprises a longitudinally extending loadcell, said housing including means of limiting bending of said loadcell to a predetermined amount so as to protect said loadcell from overload damage.

9. A scale as in claim 8 wherein said limiting means is adjustable to adjust said predetermined amount.

10. A scale as in claim 9 wherein said limiting means comprises a pair of adjustment screws.

11. A patient weighing scale comprising:
   (1) a cantilever boom having a free end and a secured end;
   (2) a housing longitudinally extended in the horizontal plane;
   (3) means mounted to said housing, for mounting said housing to said boom so as to be pivotable about a first longitudinal axis;
   (4) transducer means for measuring bending moments about a transverse horizontal, mounted in said housing, said transducer means extending longitudinally in the horizontal plane and having a second longitudinal axis;
   (5) stretcher means having rigid support means fixed thereto; and
   (6) means, pivotally mounted to said opposite ends of said transducer means, for mounting said support means to said transducer means so as to be pivotable about a third longitudinal axis parallel to said first longitudinal axis, thereby assuring that the full weight of the patient is directed vertically downward without effecting the orientation of the transducer means, said support means being fixed against rotation about said support means.

* * * * *